July 17, 1951

F. E. PAYNE 2,561,132

ROTARY SEAL WITH O RING

Filed Oct. 4, 1946

INVENTOR.
Frank E. Payne
BY Charles P. Voytech
Atty.

Patented July 17, 1951

2,561,132

UNITED STATES PATENT OFFICE 2,561,132

ROTARY SEAL WITH O RING

Frank E. Payne, Glencoe, Ill., assignor to Crane Packing Company, Chicago, Ill., a corporation of Illinois Application October 4, 1946, Serial No. 701,371

2 Claims. (Cl. 286—11.15)

This invention relates to rotary seals and particularly to such seals which employ a ring of rubber or the like of circular radial cross-section as the flexible sealing element.

Mechanical seals for effecting a seal between relatively rotatable machine elements, such as a shaft and a housing therefor, are generally comprised of a rigid ring on the housing, a washer having a running sealing fit against the ring, a flexible sealing element for effecting a seal between the washer and the shaft, and a spring compressed between the washer and an abutment on the shaft for maintaining the washer in constant sealing engagement with the ring. The flexible sealing element for effecting a seal between the washer and the shaft is molded to a particular configuration such that the desired flexibility is secured, and inasmuch as the diameters of the shaft with which the seals must operate vary greatly at increments of about $\frac{1}{32}$", it is apparent that in order to provide a seal which will be applicable for each size of shaft, a great variety of such seals is necessary thereby requiring an equally great variety of molds for molding the flexible sealing elements. The cost of making and maintaining molds is quite high, depending upon the complexity of the shape of the sealing element and the number of cavities in each mold.

It has also been found that mechanical rotary seals using rubber in the form of a bellows or diaphragm as the means for sealing an axially movable washer with respect to an axially fixed support sometimes fail because the rubber must be molded as a thin membrane in order to give the necessary freedom of movement to the washer, and the membrane, either because of the magnitude of the forces or because of the difficulty of molding thin membranes is ruptured by the fluid pressures involved.

The principal object of this invention is to provide a seal for relatively rotatable machine elements which employs as a sealing element a ring of rubber or the like which may be purchased as standard equipment from manufacturers of such items, the rings being usable in pistons, stuffing boxes, static seals and a number of other common applications. Such a sealing ring, since it is suitable for use in a large variety of applications, can be made cheaply and can be supplied to the seal manufacturer as a standard item without any outlay for molds.

Another object of this invention is to provide an improved mechanical seal, the flexible sealing means of which is simple in form and capable of withstanding large pressures without rupturing.

A more specific object of this invention is to provide a rotary seal the sealing element of which is comprised of a ring of rubber or the like having a circular radial cross-section wherein said ring is relieved of all driving force which might be impressed upon it by virtue of the friction generated between the washer of the seal and the stationary seat ring.

Another specific object of this invention is to provide a shaft seal wherein the rotary part of the seal is simply pressed upon the shaft, there being a sleeve which supports the sealing ring, drives the sealing washer directly and also provides an abutment for the spring.

These and other objects of this invention will become apparent from the following detailed description when taken together with the accompanying drawings, in which Fig. 1 is a section taken through a seal of this invention showing the seal mounted on a shaft and effective to prevent the leakage of fluid from between the shaft and a supporting housing;

Figure 1:
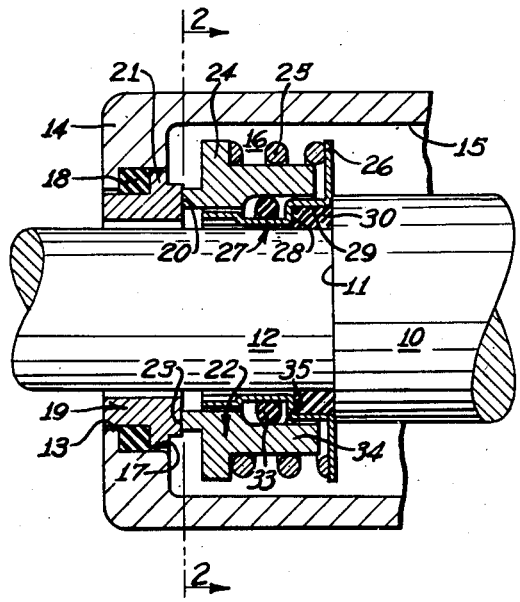

Referring now to the drawings for a detailed description of the invention and particularly to Fig. 1, there is shown a shaft 10 having a shoulder 11 thereon formed by a section of the shaft of reduced diameter 12. Said shaft 10 and its reduced section 12 passes through an opening 13 in a housing 14 which may or may not be stationary. Opening 13 is enlarged as at 15 to form a chamber 16 between shaft 12 and housing 14. A recess 17 is formed in housing 14 adjacent opening 13 and is used to hold a ring 18 of resilient deformable material such as rubber or the like. The resilient deformable ring 18 is compressed in recess 17 by means of a seat ring 19 which is angular in radial cross-section and is provided at its right-hand end (Fig. 1) with a flange 21 and a raised face 20, the raised face being rendered perfectly smooth and flat by grinding, lapping or other suitable finishing process in accordance with the degree of perfection required for the seal. It will be noted that seat ring 19 does not contact housing 14 at any point and is in fact spaced therefrom so that the sole support for the ring is the flexible deformable ring 18. Thus the ring 19 adjusts itself relative to housing 14 to take care of any misalignment or vibration to which it may be subjected without in any way destroying the seal between itself and the housing.

Cooperating with seat ring 19 is a washer 22 which is made from a material selected to have a low coefficient of friction when rubbed against the material of seat 19 and yet which will last a reasonable length of time. Thus washer 22 may be made from a phenol formaldehyde resin to which has been added graphite, asbestos fibre, antimony, tin and lead. Washer 22 has formed thereon a surface 23 which contacts raised face 20 and seat ring 19 and is similarly ground and lapped so that a fluid-tight seal is formed between seat ring 19 and washer 22 when the latter is held against the seat ring. Intermediate the ends of washer 22 is formed a flange 24 which extends radially outwardly and constitutes an abutment for a spring 25. A fixed abutment is provided for spring 25 by a flange 26 likewise extending radially outwardly and formed on the end of a sleeve 27, said sleeve having a shoulder 28 formed thereon which defines a recess 29 opening upon reduced portion 12 of shaft 10. Within recess 29 is compressed a ring 30 of resilient deformable material such as rubber or the like, ring 30 abutting on shoulder 11 on shaft 12 and serving to provide a friction drive for sleeve 27 from shaft 10. Although rubber, either natural or synthetic, or a combination of the two, has been found to be well suited for ring 30, said ring can also be made from a fibrous material which swells slightly when it is exposed to the fluid to be sealed, the swelling being relied upon to insure a tight sealing and driving fit between the sleeve, ring and shaft.

An axially slidable, rotary driving connection is provided between washer 22 and sleeve 27. This connection (Figs. 1 and 2) is comprised of a plurality of lugs 31 formed on sleeve 27 and extending into similarly shaped slots 32 formed on the interior of washer 22. Thus washer 22 may slide axially relative to sleeve 27 but relative rotation therebetween is prevented by lugs 31.

A fluid-tight seal is effected between washer 22 and sleeve 27 by a ring 33 of circular radial cross-section which is compressed between sleeve 27 and an axially extending flange 34 on washer 22. Said flange 34 has a cylindrical surface 35 formed on the interior thereof which defines a space with the exterior surface of sleeve 27 of lesser radial extent than the radial diameter of ring 35 so that said ring 35 is compressed between flange 34 and sleeve 27. However, space is provided on either side of ring 33 so that it may be rolled upon sleeve 27 by washer 22 as said washer moves axially relative to said sleeve. This rolling action of the sealing ring does not in any way disturb the seal which is effected by ring 33 between the washer and the sleeve.

The outer surface of flange 34 on washer 22 is used to assist in centering spring 25 relative to sleeve 27. It will be noted that washer 22 is itself centered by ring 33 and at either end it is guided by sleeve 27, the flange 34 cooperating with shoulder 28 to be guided or centered thereby and the main body of the washer sliding loosely over sleeve 27 and deriving support therefrom in extreme cases of misalignment.

It will be noted that with the construction shown in Fig. 1 sleeve 27 is frictionally driven from shaft 10 through the driving ring 30 so that sealing ring 33 is not required to be fitted so tightly as to drive washer 22 in a circular direction. The positive interlocking connection 31, 32 between sleeve 27 and washer 22 transfers the drive from sleeve 27 to washer 22 around ring 33 and at the same time permits washer 22 to move axially relative to sleeve 27. It will be noted further that the portion of the seal associated with the shaft, namely washer 22, sleeve 27, driving ring 30, sealing ring 33 and spring 25, constitutes a single unit as supplied by the seal manufacturer which may be pressed upon the shaft by the customer without requiring the customer to perform an assembly operation on the seal at the point of installation.

Figure 3:
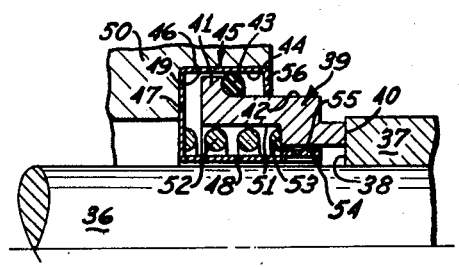
Fig. 3 is a modification of the seal of Fig. 1 wherein the parts are interchanged so that the sealing washer, sealing ring and spring are stationary.

Referring now to Fig. 3 for a description of a modification of the form shown in Fig. 1, there is shown a shaft 36 having a radial abutment 37 thereon, said abutment having a smooth radial face 38 which constitutes one of the sealing surfaces for the rotary seal. Cooperating with abutment 37 is a sealing washer 39 having a raised radial face 40 in contact with radial face 38 on abutment 37. Said faces 38 and 40 are preferably rendered perfectly smooth and flat by grinding and, if necessary, lapping, so as to form a fluid-tight seal therebetween when washer 39 is held against abutment 37.

Said washer 39 is provided with a radially outwardly extending flange 41 at the end opposite the raised face 40 and with a smooth cylindrical surface 42 adjacent to flange 41. A sealing ring 43 encircles cylindrical surface 42 and is comprised of resilient deformable material such as rubber, either natural or synthetic, or a combination of the two, and having a circular radial cross-section. The outer periphery of ring 43 extends beyond the outer periphery of flange 41 and into contact with an interior cylindrical surface 44 on a retainer 45. Said retainer 45 is in the form of a shell having an outer cylindrical part 46, a radial part 47 and an inner cylindrical part 48, the inner cylindrical part being spaced from shaft 36 so that the latter rotates freely therein. Retainer 45 is pressed into a recess 49 in a housing 50, the press fit being fluid-tight so that an effective seal is provided between retainer 45 and housing 50 and relative rotation between the retainer and housing is precluded.

Washer 39 has an internal recess 51 in which is disposed a spring 52 having one end abutting on radial wall 47 of retainer 45 and the other end abutting upon a radial wall 53 on washer 39 defining the right-hand end (Fig. 3) of the recess 51. Thus spring 52 constantly urges washer 39 in the direction of abutment 37 and maintains the cooperating sealing surfaces 40 and 38 in contact with one another.

Figure 2:
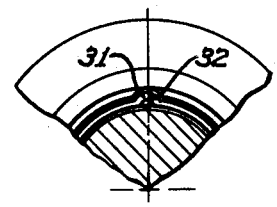
Fig. 2 is a fragmentary front elevation of the seal of Fig. 1 taken along line 2—2 thereof.

Substantially all torque resulting from the friction developed between surfaces 40 and 38 is removed from sealing ring 43 by means of lugs 54 formed in inner cylindrical part 48 and cooperating with slots 55 formed on the interior of washer 39, said lugs and slots being identical with those shown in Fig. 2.

In order that the entire seal may be a self-contained unit, a short flange 56 is rolled or spun radially inwardly from the end of outer cylindrical portion 46 after washer 39 and ring 43 are pressed into retainer 45. Flange 56 prevents sealing ring 43 from leaving the retainer 45 and since flange 56 extends radially inwardly beyond the outer periphery of flange 41 on washer 39 said flange 41 will serve to hold, washer 39 in retainer 45 against the action of spring 62 at all times.

The modification shown in Fig. 3 is particularly well adapted for use in water pumps for gasoline engines and the like. When so used the abutment 37 may be formed from the impeller of the pump which may be either pressed upon or otherwise secured to shaft 36. Sealing ring 43 effectively prevents the water from contacting the spring 52 and since the water may contain an anti-freeze solution, as well as particles of rust and dirt, it will be apparent that spring 52 is protected by ring 43 and the abrasive action of the rust and dirt particles in the water, as well as the disintegrating action which may result from the particular anti-freeze used.

Figure 4:
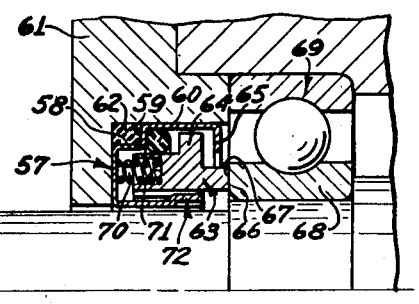
Fig. 4 is another modification similar to the form shown in Fig. 3 but shortened so as to be interchangeable with oil and grease closures now on the market.

Fig. 4 shows another modification of the seal of Fig. 1. In this modification, as in the Fig. 3 modification, the sealing washer and associated parts are stationary and the washer operates against the inner race of a ball bearing which rotates with a shaft or the like. The retainer 57 is similar to retainer 45 of the Fig. 3 form except that it has a recess 58 formed in the upper left-hand corner thereof which provides a radial abutment 59 for confining a sealing ring 60 of circular radial cross-section. The opening between housing 61 and recess 58 may be filled with a suitable packing material 62 to insure a fluid-tight seal between the retainer and housing. When packing material 62 is used, retainer 45 need not have a press fit in housing 61 and hence the outer cylindrical surface of retainer 57 need not be held to such close tolerances. Washer 63 is shorter than the corresponding washer 39 in Fig. 3 and has a radially outwardly extending flange 64 at the front part thereof to confine sealing ring 60 between itself and radial abutment 59 and also to act as an abutment by which the washer is held in retainer 57 after flange 65 is rolled in on the retainer. The washer 63 has a sealing surface 66 which cooperates with the radial face 67 of the inner race 68 of a ball bearing 69. A plurality of short helical springs 70 is used in place of the single coil spring 52 of Fig. 3, said spring 70 being positioned in blind holes 71 formed in washer 63. The same means is used to drive washer 63 as is used in the Fig. 1 and Fig. 3 forms and is shown at 72.

The recess 58 in the retainer of the Fig. 4 modification can be made longer in an axial direction so as to provide a second cylindrical surface of lesser diameter than the diameter of the outside of retainer 57 thereby adapting the Fig. 4 form for use with a housing having a smaller recess and providing a choice of two diameters to be used in designing a housing for the seal.

Figure 5:
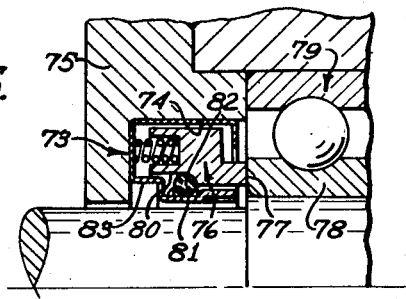
Fig. 5 is a modification similar to Fig. 4 with the parts thereof altered so that the seal can be used either as a shaft seal or as a closure.

The Fig. 5 modification is similar to the one shown in Fig. 4 except that the position of the sealing ring and recess in the retainer has been reversed so that these parts are on the inside of the seal. Thus the Fig. 5 modification is comprised of a retainer 73 pressed into a recess 74 in a housing 75 and containing a sealing washer 76 having a radially disposed sealing surface 77 running against the side of inner race 78 of a ball bearing 79. Washer 76 has a recess 80 on the inside thereof which with the inner cylindrical wall 81 of housing 75 defines a space in which is compressed a sealing ring 82. As in the preceding forms, sealing ring 82 is of circular radial cross-section and is compressed radially but is free to roll slightly in an axial direction. A recess 83 is formed on the inner left-hand corner (Fig. 5) of the retainer which serves to confine sealing ring 82 and can, if necessary, receive packing (not shown) so that the entire seal may be pressed upon a shaft and used to seal against the stationary housing instead of a rotary abutment. Thus in the Fig. 5 form a retainer is used which may be pressed into a housing as shown using the outer cylindrical wall thereof for this purpose or it may be pressed upon a shaft merely by the addition of suitable packing in recess 83. The Fig. 3 and Fig. 4 forms are likewise adapted to be pressed upon a shaft but the seal between the retainer and the shaft in each case will be of a metal-to-metal variety and will require an accurately finished interior surface on the retainer whereas in the Fig. 5 form the seal is effected by a compressible sealing ring which is not particularly critical as to the surface condition or size of the shaft with which it is to be used.

It is apparent from the foregoing that there are many variations possible in the basic design shown in Fig. 1. In all of them, however, the sealing element between the washer and retainer is a simple ring of circular radial cross-section which may be readily purchased and which, by reason of the many other uses to which it can be put, is manufactured in large quantities, thereby making possible a low unit price. In all of the designs shown, the assembly of the seal is very simple and rapid, thus further reducing the cost of the seal. Likewise, in all of the designs shown the sealing element is relieved of substantially all driving torque. It will be noted that the sealing element is not confined in a groove either in the retainer or in the washer and hence the retainer and washer can be made in simple dies and molds without any subsequent grooving operation.

It is understood, therefore, that the foregoing description is illustrative of preferred embodiments of this invention and that the scope of this invention is not to be limited thereto, but is to be determined by the appended claims.

What is claimed is:

1. A fluid sealing device for effecting a seal between relatively rotatable elements comprising a sealing washer having a radially outwardly extending flange and a radially inwardly extending flange, a retainer for the washer having a cylindrical wall telescopically disposed with respect to the washer and a pair of radial sections, one axially spaced from each flange, said radial sections being axially separated from one another, a cylindrical section connecting the spaced radial sections such that a recess is formed in the retainer; spring means compressed between one flange and the radial section spaced from said one flange to urge the washer away from said radial section, and a ring of resilient compressible material compressed between the washer and the cylindrical wall in the space defined by the other flange and the radial section spaced therefrom to effect a fluid-tight seal between the washer and retainer, means for preventing relative rotation between the washer and retainer, and means compressed in the recess in the retainer and against one of the relatively rotatable elements to prevent relative rotation between the retainer and the said one relatively rotatable element.

2. A fluid sealing device as described in claim 1, said spring means being compressed between the outwardly extending flange and the radial section spaced from said one flange, and said one flange being axially spaced from the end of the washer adjacent the said radial section, said spring encircling the washer and being centered thereby.

FRANK E. PAYNE.

REFERENCES CITED

The following references are of record in the file of this patent:

UNITED STATES PATENTS

| Number | Name | Date |
|---|---|---|
| 2,185,554 | Janette | Jan. 2, 1940 |
| 2,222,779 | McHugh | Nov. 26, 1940 |
| 2,259,422 | Karlberg | Oct. 14, 1941 |
| 2,347,118 | Matter | Apr. 18, 1944 |
| 2,363,110 | Krug | Nov. 21, 1944 |
| 2,370,964 | Janette | Mar. 6, 1945 |
| 2,429,953 | Bottomley | Oct. 28, 1947 |